United States Patent [19]

Berg et al.

[11] Patent Number: 4,653,847
[45] Date of Patent: Mar. 31, 1987

[54] FIBER OPTICS SEMICONDUCTOR PACKAGE

[75] Inventors: Howard M. Berg, Scottsdale; Curtis W. Mitchell, Phoenix, both of Ariz.

[73] Assignee: Motorola, Inc., Schaumburg, Ill.

[21] Appl. No.: 237,177

[22] Filed: Feb. 23, 1981

[51] Int. Cl.[4] .................................................. G02B 6/42
[52] U.S. Cl. ............................... 350/96.20; 350/96.18; 350/320
[58] Field of Search ............... 350/96.17, 96.18, 96.20, 350/320; 357/17, 30; 250/227

[56] References Cited

U.S. PATENT DOCUMENTS

| | | | |
|---|---|---|---|
| 4,118,100 | 10/1978 | Goell et al. | 350/96.20 |
| 4,182,545 | 1/1980 | Greer | 350/96.20 |
| 4,241,978 | 12/1980 | Dubois et al. | 350/96.20 |
| 4,257,672 | 3/1981 | Balliet | 350/96.17 |
| 4,269,648 | 5/1981 | Dakss et al. | 350/96.18 X |
| 4,329,190 | 5/1982 | Berg et al. | 357/17 X |
| 4,433,898 | 2/1984 | Nasiri | 350/96.17 |

FOREIGN PATENT DOCUMENTS 0118009 9/1980 Japan ................................ 350/96.20

OTHER PUBLICATIONS

Smith, "High-Radiance LED's Operate at 1.3 μm for Long-Haul Optic Cable," *Electronics*, May 24, 1979, pp. 73-74.

Dakss et al, "Simple Self-Centring Technique for Mounting Microsphere Coupling Lens on a Fibre," *Electr. Lett.*, vol. 16, 1980, pp. 463-464.

*Primary Examiner*—John Lee
*Attorney, Agent, or Firm*—Joe E. Barbee; Paul F. Wille

[57] ABSTRACT

A semiconductor package for use in fiber optics systems is disclosed wherein optical performance is enhanced by a lens between a fiber segment and the photoactive area of the semiconductor. The lens is spaced a predetermined distance from the fiber by a layer of elastomer. During assembly of the package, the fiber provides a convenient means for handling the lens.

13 Claims, 6 Drawing Figures

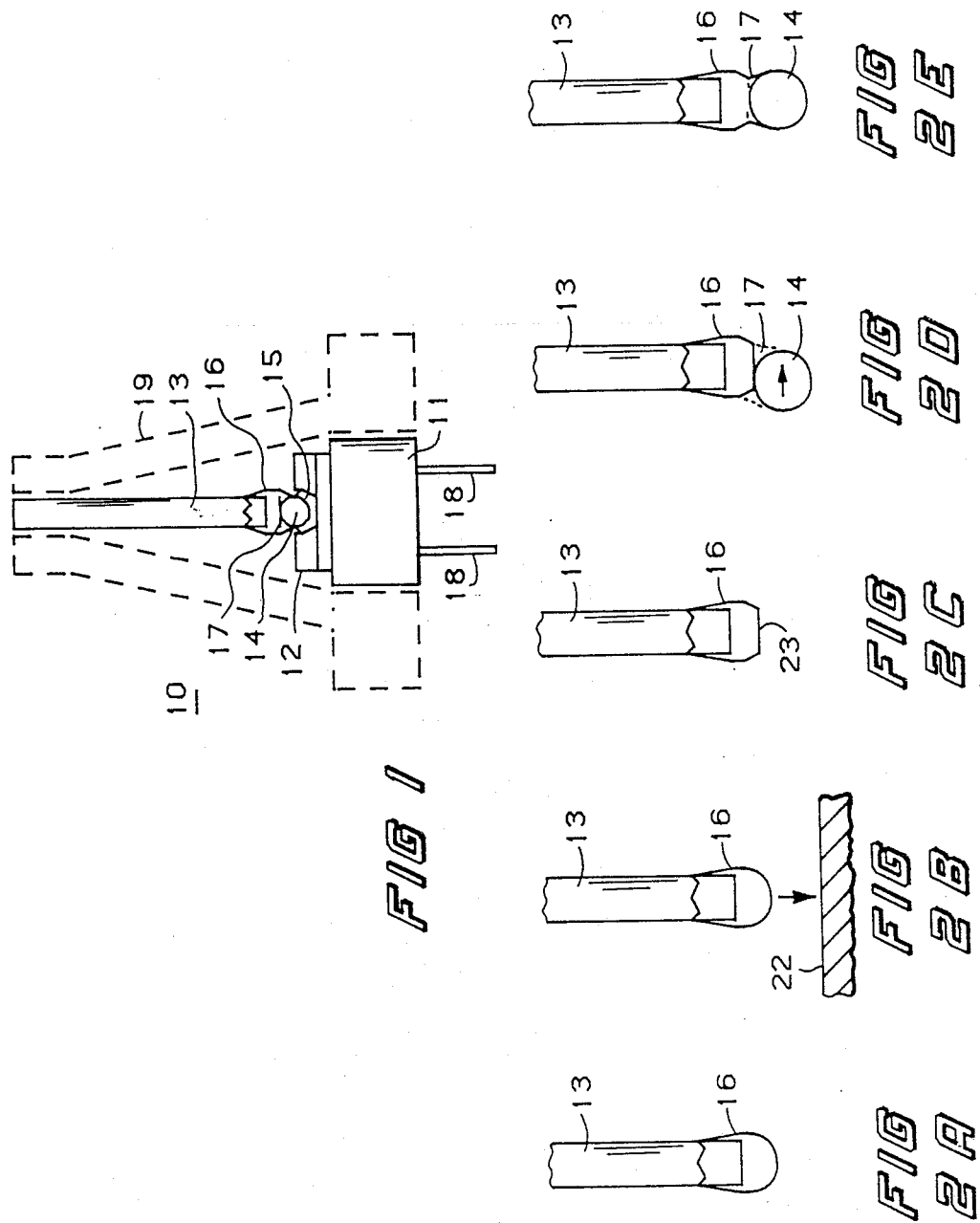

FIBER OPTICS SEMICONDUCTOR PACKAGE

This invention relates to fiber optic semiconductor packages and, in particular, to fiber optics packages having a lens positioned between an internally housed fiber and the photoactive area on the die or chip.

A continuing concern in the manufacture of semiconductor packages for fiber optics is the amount of light launched into the system fiber. If greater luminous flux were available, one could use longer lengths of system fiber. There are two ways to increase the luminous flux in a fiber. One is to increase the luminosity of the source. The other is to improve the coupling between the photoactive area of the semiconductor and the optical fiber. This invention relates to the latter and is useful for both light emitting and light sensing semiconductor devices.

In the past, a number of systems have been used to increase the optical coupling between the photoactive area on the semiconductor chip or die and the optical fiber. One system uses careful alignment of the flat ended fiber, which is then bonded in place over the die. Another uses a package in which a lens in the form of a glass bead is attached to the die and the top surface of the package comprises a window. In the latter system, the photoactive area of the die is more or less at a focus of the lens. The lens package is then inserted into a suitable connector, to which the optical fiber is attached.

A problem with these systems is that test data indicates that there is still a not insignificant amount of light loss. A further problem with the lens package system is that it is cumbersome to assemble. Alignment of the lens is difficult and, in general, the lens package of the prior art is not particularly efficient optically. This is especially true when coupling into small diameter system fibers.

Since current optical fibers typically have a diameter of 8 mils (0.2 mm) or less and the trend is to smaller fibers, handling, assembling, and aligning the die, the fiber and the lens become formidable tasks. Also, if etched well diodes are used as the optical source, accurately fitting a lens in or on the well of the diode is difficult.

Assembling fiber optic semiconductor packages presents a further problem when temperature changes are considered, viz, the differences in coefficient of thermal expansion among the package components used. If the fiber, lens, and die are positioned too closely together, large temperature changes during manufacture or use will likely cause the parts to jam together, ruining or degrading the die. If the parts are too close or separated too much, particularly the lens and die, optical performance suffers.

It is known that surface tension in a liquid droplet on the end of a small fiber will cause a glass bead therein to center itself. The problem is that surface tension forces are so great that the bead is held tightly against the end of the fiber, separated only by a film of 10,000 Å ($1 \times 10^{-6}$ m) or less. A greater spacing is needed to allow for fiber movement caused by mismatched coefficients of thermal expansion of the package materials, without significant commensurate movement of the lens towards the semiconductor device.

In view of the foregoing, it is therefore an object of the present invention to provide a fiber optic semiconductor package with improved coupling efficiency.

Another object of the present invention is to provide an easily assembled and aligned fiber optic semiconductor package.

A further object of the present invention is to provide a low cost fiber optic semiconductor package assembly process.

Another object of the present invention is to provide a fiber optic semiconductor package which is tolerant of large temperature variations.

The foregoing objects are achieved in the present invention wherein it has been found that a glass bead can be used as a lens. Further, when assembling the device, it has been found that a suitable fiber-to-lens spacing can be provided by a flattened, partially cured droplet on the end of the fiber, to which the bead is then attached by uncured polymer. The fiber and bead are then aligned with the die and the components joined with additional polymer, all of which is then fully cured.

A more complete understanding of the present invention can be obtained by considering the following detailed description in conjunction with the accompanying drawings, in which:

FIG. 1 illustrates a fiber optic semiconductor device in accordance with the present invention.

FIGS. 2A–2E illustrate the assembly of a fiber optic semiconductor device in accordance with the present invention.

DETAILED DESCRIPTION OF THE INVENTION

FIG. 1 illustrates a preferred embodiment of a fiber optic semiconductor package 10 in accordance with the present invention. While illustrated in FIG. 1 as utilizing a "Burrus" or etched well diode, it is understood by those skilled in the art that any suitable photo-emitter or photo-detector may be used in accordance with the present invention. Similarly, the photo-emitter or detector is not limited to simply a diode but may include a semiconductor die or chip having additional electronics formed thereon.

In particular, package 10 comprises a thermally conductive substrate or header 11 to which is attached the photoactive semiconductor die 12. Positioned above the photoactive area of die 12 is a segment of optical fiber 13. Positioned between the photoactive area of semiconductor 12 and fiber 13 is lens 14, which preferably comprises high index of refraction glass, i.e. glass having a refractive index greater than the index of refraction of the medium surrounding the glass. To assure good coupling efficiency, lens 14 and the light conducting portion of fiber 13 have diameters greater than the smallest linear dimension of the photoactive area of semiconductor chip 12.

As used herein, "optical fiber" refers to any single or multiple strand optical fiber known in the art. Similarly, "lens" refers to a body of suitable index of refraction and comprising any suitable material; for example, and without limitation, glass, plastic, GaP. Further, the lens can have any lenticular shape; spherical, hemispherical, double convex. In a preferred embodiment of the present invention, fiber 13 comprises a single strand optical fiber and lens 14 comprises a glass bead or sphere. The choice of a specific fiber and lens combination is readily made empirically considering cost, function, and performance.

Lens 14 is separated from semiconductor 12 and fiber 13 by predetermined distances to assure both good optical coupling as well as tolerance for the various coefficients of expansion of packaging materials and the shrinkage, if any, of the potting material. By way of example only, it has been found that a spacing of approximately 25 microns (1 mil) between lens 14 and the photoactive area of semiconductor 12 and approximately 25 microns between lens 14 and the end of fiber 13 provides good optical coupling therebetween. The actual spacing depends upon a number of factors, including the differences in the thermal coefficients of expansion for the package materials used, the index of refraction and diameter of lens 14, the diameter of the light conducting portion of fiber 13, and the photoactive area of semiconductor chip 12. In general, spacings of from 5 to 200 microns may be used.

The spacing between the end of fiber 13 and lens 14 is determined by one or more partially cured droplets 16. Lens 14 is held in place by an additional droplet 17, as more fully illustrated in FIG. 2.

In FIG. 2A, fiber 13 has been immersed and withdrawn from a reservoir of uncured, translucent, polymeric material, resulting in the formation of droplet 16 on the end thereof. It is only necessary that the end of fiber 13 be covered with sufficient material to form the desired thickness of partially cured material. This depends in part upon the size of the fiber, the desired thickness and the viscosity of the uncured polymer. For example, using a 8 mil (200 micron) fiber and silicone elastomer polymer, fiber 13 is inserted approximately 2 mils (50 micron) into the polymer and then withdrawn.

As illustrated in FIG. 2B and 2C, fiber 13, with droplet 16 attached, is then brought into contact with hot plate 22 whereby the bulbous end portion is flattened and partially cured. Fiber 13 is held a predetermined distance from hot plate 22 thereby flattening the end of droplet 16 and providing a surface 23 a predetermined distance from the end of fiber 13, and with the desired diameter of surface 23. It is preferred that the diameter of surface 23 be smaller than the diameter of the fiber core or the diameter of the fiber bundle if multiple strand fiber is used.

Alternatively, the bulbous end of the fiber is positioned over the hotplate so that the polymer begins to gel, i.e. increase in viscosity. The fiber is then dropped a predetermined distance onto the hotplate to form surface 23. Using GE-261 silicone polymer, a hotplate temperature of about 175° C. is appropriate. A wait time of about 15 seconds over the hotplate will cause this material to partially gel. Dropping the fiber approximately 2.5 mm (0.1 inch) then provides the desired spacing. If a larger spacing between the end of fiber 13 and lens 14 is desired, the dipping and flattening is repeated.

As illustrated in FIGS. 2D and 2E, fiber 13 with flattened droplet 16 is then dipped again into a shallow reservoir of polymer to provide a second droplet 17. Fiber 13 is then brought in contact with lens 14, which may or may not be centered on the end of fiber 13. Because of the surface tension of polymer 17, a self-centering action takes place as illustrated in FIGS. 2D and 2E. The diameter of the flattened surface partially determines how precisely the lens is centered on the end of the fiber. Since the surface tension forces far exceed the force necessary to hold bead 14 against the force of gravity, fiber 13 with lens 14 attached may be easily handled during subsequent fabrication without losing lens 14 or upsetting the centering thereof, even with polymer 17 in an uncured state.

Subsequent assembly operations include the partial curing of droplet 17, the alignment of fiber 13 and lens 14 to the semiconductor chip 12, and injection of a polymer droplet between the semiconductor chip and lens. The droplet quickly gels on the warmed semiconductor chip surface. The entire assembly is then fully cured, firmly fixing fiber 13, lens 14, and semiconductor chip 12. Because of partially cured droplet 16, fiber 13 is optically spaced from lens 14 which, in turn, is optically spaced from the photoactive area of semiconductor die 12. By virtue of droplet 17, lens 14 is centered beneath fiber 13. This subassembly is then attached to an appropriate enclosure 19 as illustrated in FIG. 1.

There is thus provided by the present invention an improved fiber optic package having an improved optical system for coupling light either to or from the optical fiber and in which the package is tolerant of wide temperature variations through the cushioning provided by the thicknesses of cured polymer separating the lens and fiber elements, and with minimal variations in level of coupled light. (As used herein, cured refers to any process by which the droplets of material are converted from a liquid state to a resilient solid state.) Also, since the lens is easily manipulated by the fiber segment, the assembly method is readily adapted to automated manufacture, particularly batch processing of the fibers for attachment to the semiconductor die.

Having thus described the invention it will be apparent to those skilled in the art that various modifications can be made within the spirit and scope of the present invention. For example, while described in a preferred embodiment as using heat to effect a cure, other curing or solidification mechanism may be used, e.g. UV light. The choice of materials used for the lens and polymer depend on desired costs and performance. Other polymers found suitable include D.C. 6101 and D.C. 6103 silicones as manufactured by Dow-Corning Corporation.

We claim:

1. An optical system comprising:
a segment of optical fiber;
a lenticular shaped body;
at least one layer of polymeric material, on one end of said segment, having a thickness of 5-200 microns (0.2-8.0 mils); and
adhesive means for securing said body to said one end whereby said body is spaced from said one end by the thickness of said layer.

2. The optical system as set forth in claim 1 wherein said body comprises a glass sphere.

3. The optical system as set forth in claim 2 wherein said glass sphere has an index of refraction greater than the index of refraction of said adhesive means.

4. The optical system as set forth in claim 1 wherein said polymeric material separating said fiber and said body comprises more than one layer.

5. A semiconductor package comprising:
a segment of optical fiber;
a lenticular body proximate one end of said segment and spaced therefrom by 5 to 200 microns (0.2 to 8.0 mils);
said body being attached to said segment; and
a semiconductor die having a photoconductive area proximate said body.

6. The semiconductor package as set forth in claim 5 wherein said body comprises a spherical lens.

7. The semiconductor package as set forth in claim 6 wherein said lens has a diameter larger than the smallest linear dimension of said photoactive area.

8. The semiconductor package as set forth in claim 6 wherein said lens has an index of refraction greater than that of the medium around said lenticular body.

9. The semiconductor package as set forth in claim 5 and further comprising:
   means having an index of refraction of less than that of the body for attaching said fiber, body and die to one another.

10. A method for assembling a fiber optic semiconductor device comprising the steps of:
    forming a bulbous portion having a flat spot on one end of a segment of optical fiber;
    dipping said bulbous portion in an uncured polymer;
    withdrawing said bulbous portion from said polymer to form a droplet about said portion;
    inserting a lenticular body into said droplet;
    gelling said droplet;
    aligning said body with the photoactive area of a semiconductor die; and
    fixing said fiber and body to said die.

11. The method as set forth in claim 10 and further comprising the step of
    causing said droplet to gel prior to said aligning step.

12. The method as set forth in claim 11 wherein said forming step comprises the steps of:
    providing a droplet of uncured polymer on the end of said fiber;
    causing said droplet to gel; and
    partially flattening said droplet at a point opposite said fiber.

13. The method as set forth in claim 12 wherein the steps of claim 12 are repeated to increase the distance between the end of said optical fiber and said flat spot.

* * * * *